US006698814B1

(12) United States Patent
Mills et al.

(10) Patent No.: US 6,698,814 B1
(45) Date of Patent: Mar. 2, 2004

(54) SLIDABLE SUN VISOR (75) Inventors: Donald Mills, Sandusky, MI (US); Jay Burgess, Imlay City, MI (US)

(73) Assignee: Grupo Antolin Ingenieria, S.A., Burgos (ES)

( * ) Notice: Subject to any disclaimer, the term of this patent is extended or adjusted under 35 U.S.C. 154(b) by 0 days.

(21) Appl. No.: 10/262,709

(22) Filed: Oct. 2, 2002

(Under 37 CFR 1.47)

(51) Int. Cl.[7] .................................................. B60J 1/02
(52) U.S. Cl. .................................................. 296/97.11
(58) Field of Search .............................. 296/97.11, 97.9, 296/97.12, 97.13

(56) References Cited

U.S. PATENT DOCUMENTS

| | | | | |
|---|---|---|---|---|
| 4,902,063 A | | 2/1990 | Crink ........................ 296/97.11 |
| 4,925,233 A | | 5/1990 | Clark ........................ 296/97.11 |
| 4,998,765 A | * | 3/1991 | Van Order et al. ....... 296/97.11 |
| 5,004,288 A | | 4/1991 | Viertel et al. ............. 296/97.11 |
| 5,409,285 A | * | 4/1995 | Snyder et al. ............ 296/97.11 |
| 5,556,154 A | * | 9/1996 | Vaxelaire .................... 296/97.1 |
| 5,580,118 A | | 12/1996 | Crotty, III ................. 296/97.12 |
| 5,653,490 A | | 8/1997 | Fink et al. ................ 296/97.11 |
| 5,765,899 A | | 6/1998 | Watjer et al. ............. 296/97.11 |
| 6,010,174 A | * | 1/2000 | Murdock et al. ......... 296/97.11 |
| 6,220,644 B1 | | 4/2001 | Tiesler et al. ............. 296/97.11 |
| 6,435,593 B2 | * | 8/2002 | Welter ....................... 296/97.11 |
| 2001/0050493 A1 | | 12/2001 | Welter ......................... 296/97.5 |
| 2002/0011738 A1 | | 1/2002 | Viertel et al. ............. 296/97.11 |
| 2002/0030379 A1 | | 3/2002 | Sturt et al. ................. 296/97.2 |

* cited by examiner

Primary Examiner—D. Glenn Dayoan
Assistant Examiner—Lori L Coletta
(74) Attorney, Agent, or Firm—Young & Basile, PC (57) ABSTRACT

A sun visor that has a core formed of first and second foldable halves. A guide is mounted on one of the core halves and receives a support arm. A carrier has a through aperture. The support arm moveably extends through the guide into the carrier. Ribs are formed on each of the core halves and respectively engage oppositely opening channels in the carrier to support sliding movement of the carrier and the core as the core is moved relative to the support arm. In a non-sliding configuration, a short length support arm extends through the guide with the carrier, with the carrier non-moveably mounted in the guide.

7 Claims, 10 Drawing Sheets

SLIDABLE SUN VISOR

BACKGROUND

The present invention relates, in general, to vehicle sun visors.

Sun visors are used in vehicles to provide front and side window protection from sunlight entry. Such sun visors are pivotal about a longitudinal axis between a stowed position adjacent the headliner and a deployed position angularly extending from the headliner. Most sun visors can also be unlocked from a headliner mounted clip or D-ring and pivoted to the side window about a support arm attached to the vehicle headliner. A biasing means is typically mounted within the visor to prevent movement and noise when the sun visor is in the stowed position.

Over the years, various enhancements or features have been added for sun visors to increase their versatility as well as to add other convenience factors to the vehicle occupants.

One such feature is the telescopic extension of the entire sun visor along the longitudinal axis of the support arm to enable the sun visor to be repositioned laterally across the windshield or the side window to block sun light entry in a particular direction for an occupant.

Another common feature is a mirror with or without a pivotal cover and with or without an illumination means which is mounted in one surface of the sun visor, typically the surface facing the headliner when the sun visor is in the stowed position. The sun visor need only be pivoted to the angular downward extending position to allow use of the mirror.

When an illumination means, such as lamps, are provided around the mirror, electrical conductors or wires extend through the A pillar of the vehicle body and the support arm to the individual lamps in the sun visor.

Various means have been provided to mount fabric or decorative covers over the plastic sun visor core. One such mount traps the ends of the fabric cover between the two clam shell core halves when the halves are moved to their closed, locked position. Another mount utilizes projections on the inner surfaces of the core halves over which the inner edges of the fabric cover are forced.

Heat stake projections have also been provided about the periphery of the core halves. In this mounting technique, the edges of the fabric cover are forced over the heat stake projections and then heat is applied to melt the stakes through the interstices of the fabric cover to fixedly retain the inner edges of the cover in a fixed position on the sun visor core.

SUMMARY

The present invention is a sun visor having a unique structure to support sliding or telescoping movement.

In one aspect, the sun visor includes a core having first and second foldable core halves. A guide is formed on one of the first and second core halves and receives a support arm attachable to the vehicle.

The core and a slide carrier are axially moveable along the support arm. In one aspect, rib means includes first and second ribs respectively carried on the first and second core halves. The carrier includes first and second channels opening oppositely from each other and respectively receiving the first and second ribs.

A biasing clip is mounted in the carrier in engagement with the support arm for normally biasing the carrier and the surrounding core in one direction.

In another aspect, the elongated support arm for sliding core movement is replaced by a short length support arm mounted in the guide. In this aspect, the carrier is also mounted in the guide and is non-moveable with respect to the guide.

The unique sun visor of the present invention has a structure which supports either sliding and non-sliding movement without modification to the sun visor core configuration.

To support sliding sun visor movement, an elongated support arm is employed to support sliding movement of the carrier and the core with respect to the support arm. The opposed channels and ribs provide enhanced stability of the core for a smooth sliding movement without impingement.

At the same time, the elongated support arm may be replaced with a short length support arm which engages the guide and the carrier mounted in the guide to support only pivotal movement of the sun visor. In this manner, both sliding and non-sliding sun visor movements may be provided by the same sun visor construction with the only additional requirement being two different support arms. This reduces the overall manufacturing cost of the sun visor to accommodate different applications.

BRIEF DESCRIPTION OF THE DRAWING

The various features, advantages and other uses of the present invention will become more apparent by referring to the following detailed description and drawing in which.

DETAILED DESCRIPTION

Referring now to the drawings, and to FIGS. 1–14 in particular, there is depicted a sun visor denoted generally by reference number 10 which includes a number of features, all described hereafter, which may be used in various combinations as well as individually, separate from the other features.

Figure 7:
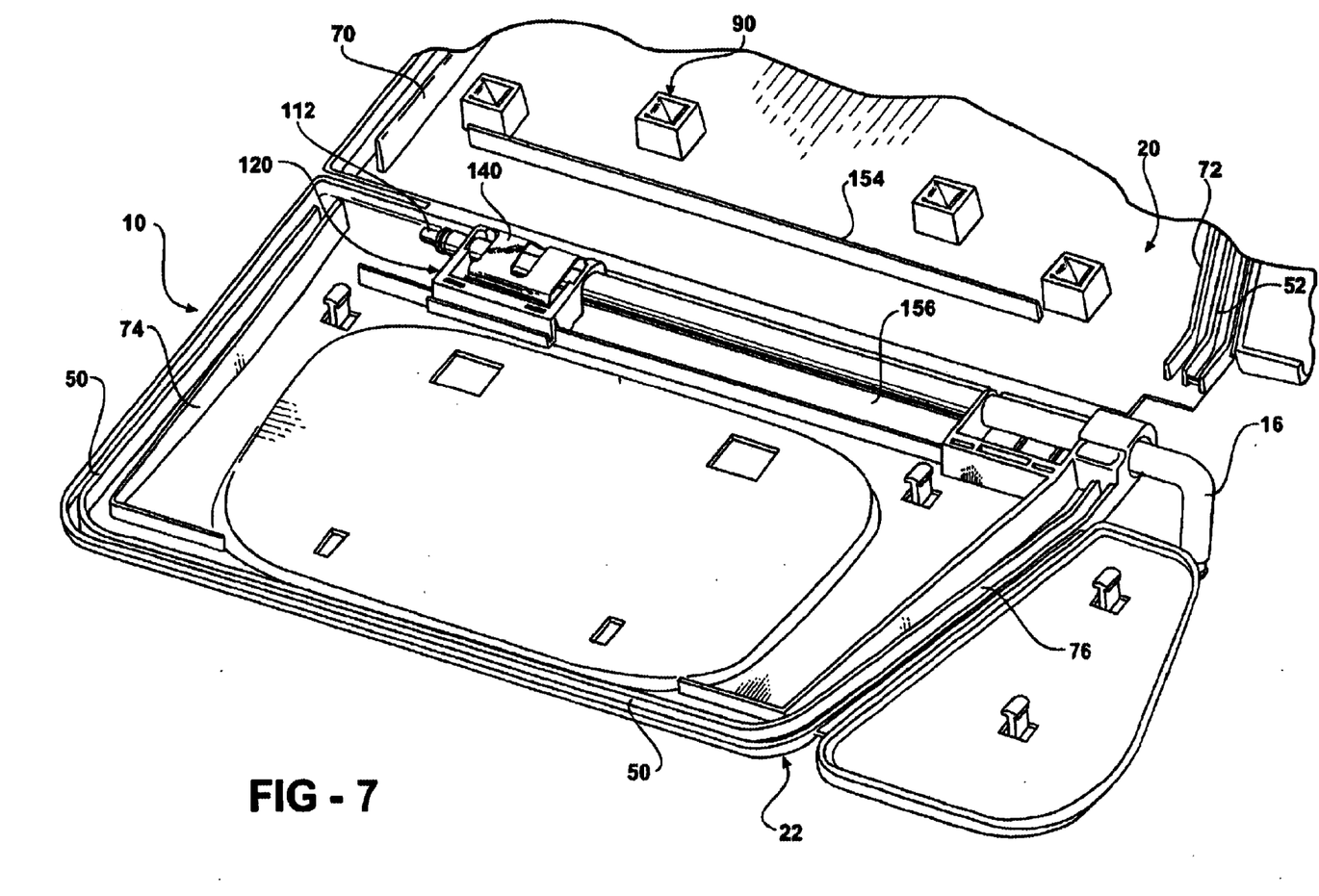
FIG. 7 is a perspective view of the sun visor of FIG. 1 depicting the slider means in the normal, retracted position.
Figure 8:
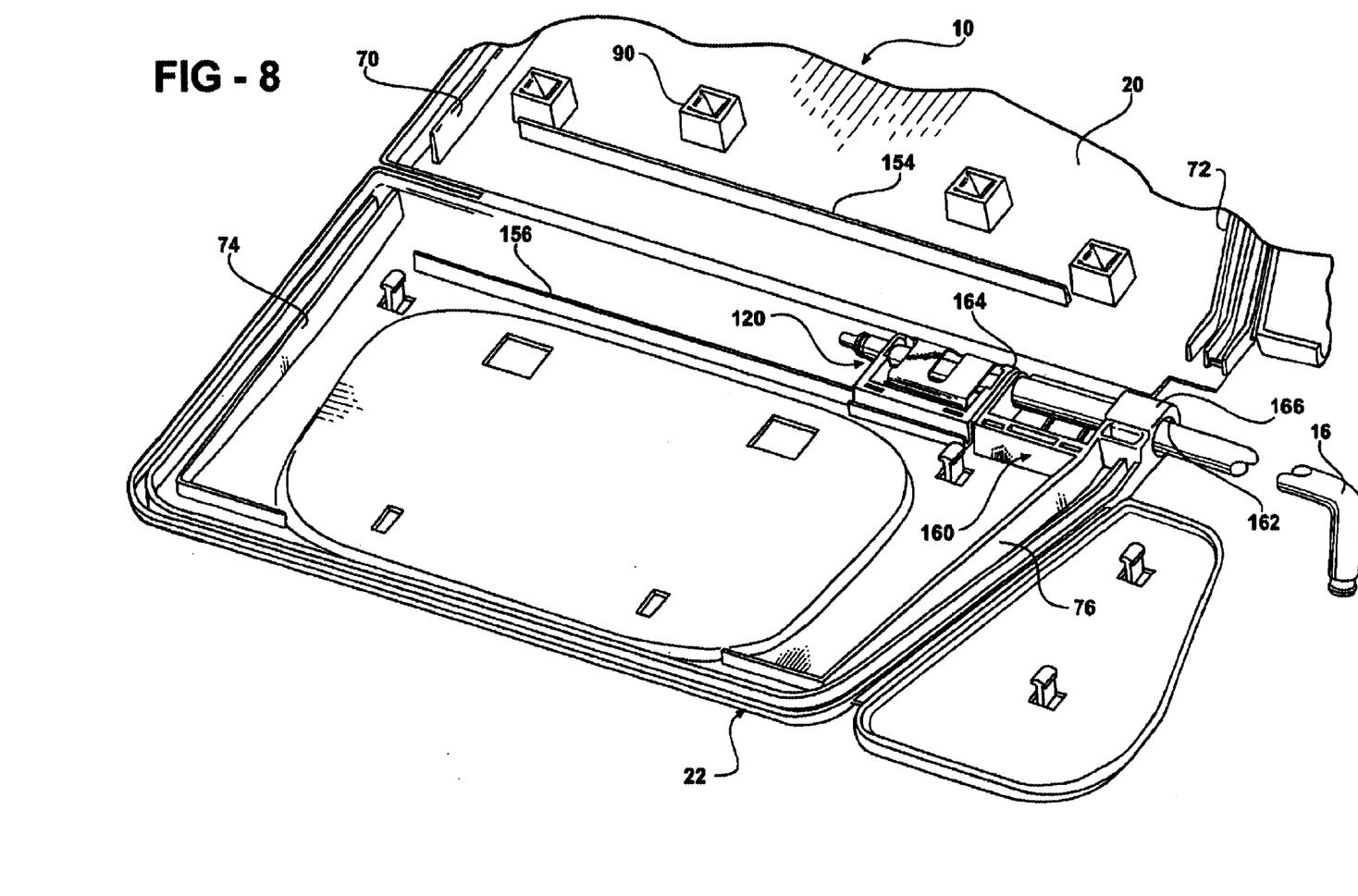
FIG. 8 is a perspective view similar to FIG. 7, but showing the slide carrier in the fully extended sun visor position.
Figure 9:
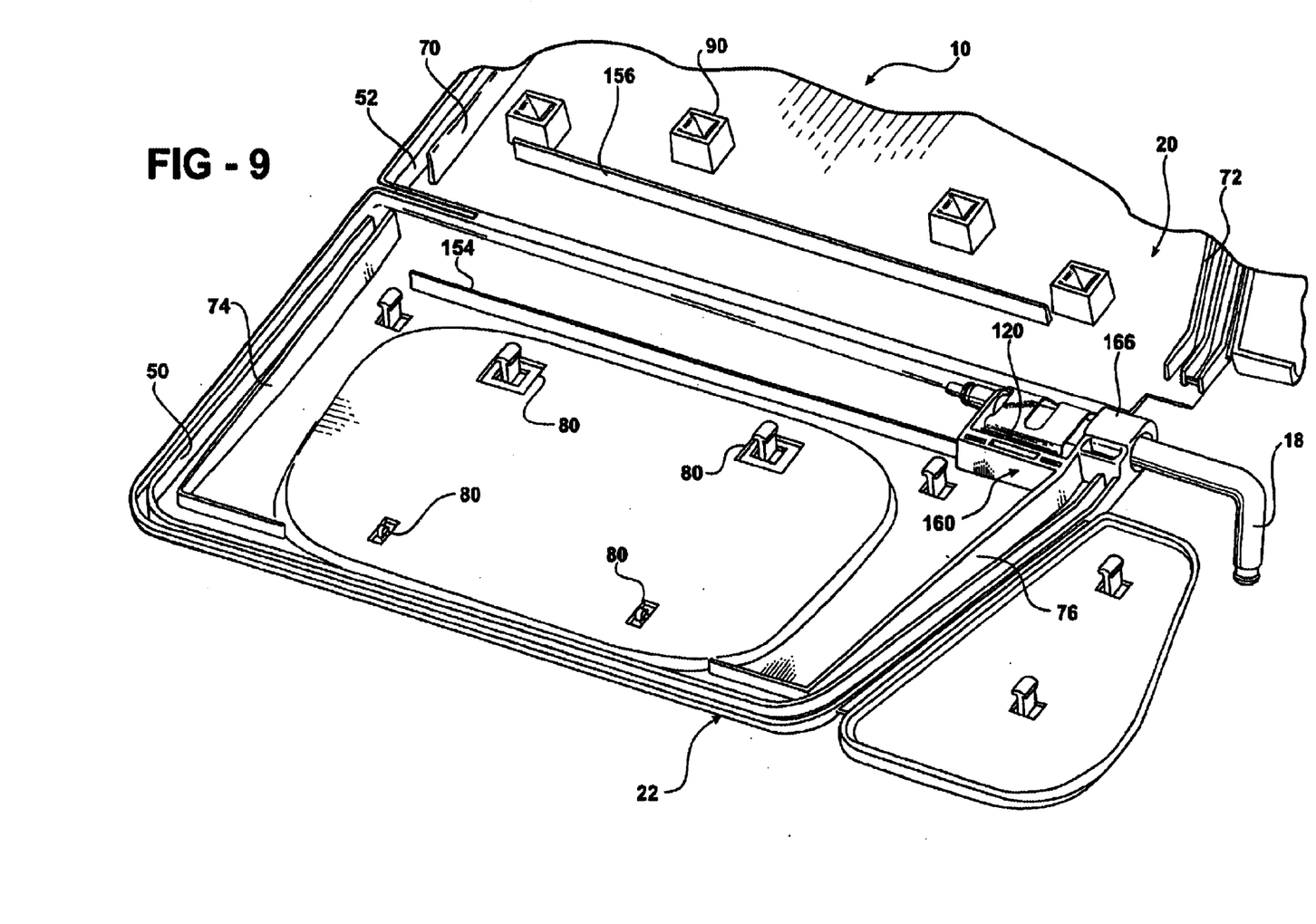
FIG. 9 is a perspective view of the sun visor of FIG. 1 having a short length, non-telescoping support arm.

In general, the sun visor 10 includes a core 12, a cover 14 typically made of fabric, including synthetics and natural fabrics, a support arm formed of either a long length support arm 16 allowing telescoping movement of the sun visor 10 as described hereafter and as shown in FIGS. 7 and 8 or a short length support arm 18 shown in FIG. 9 which does not provide telescoping extension of the sun visor 10. The sun visor 10 may also include a mirror assembly shown in various feature combinations in FIGS. 11–14.

Figure 2:
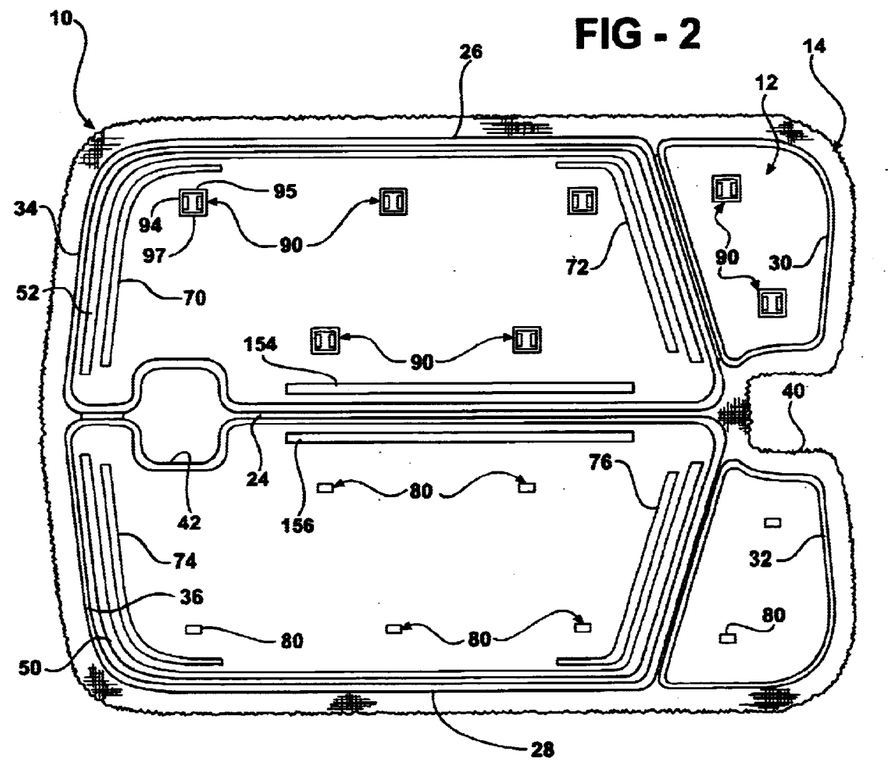
FIG. 2 is an elevational view of an open clam shell core for the sun visor shown in FIG. 1, depicting the initial step of attaching the fabric cover to the core.
Figures 3, 4:
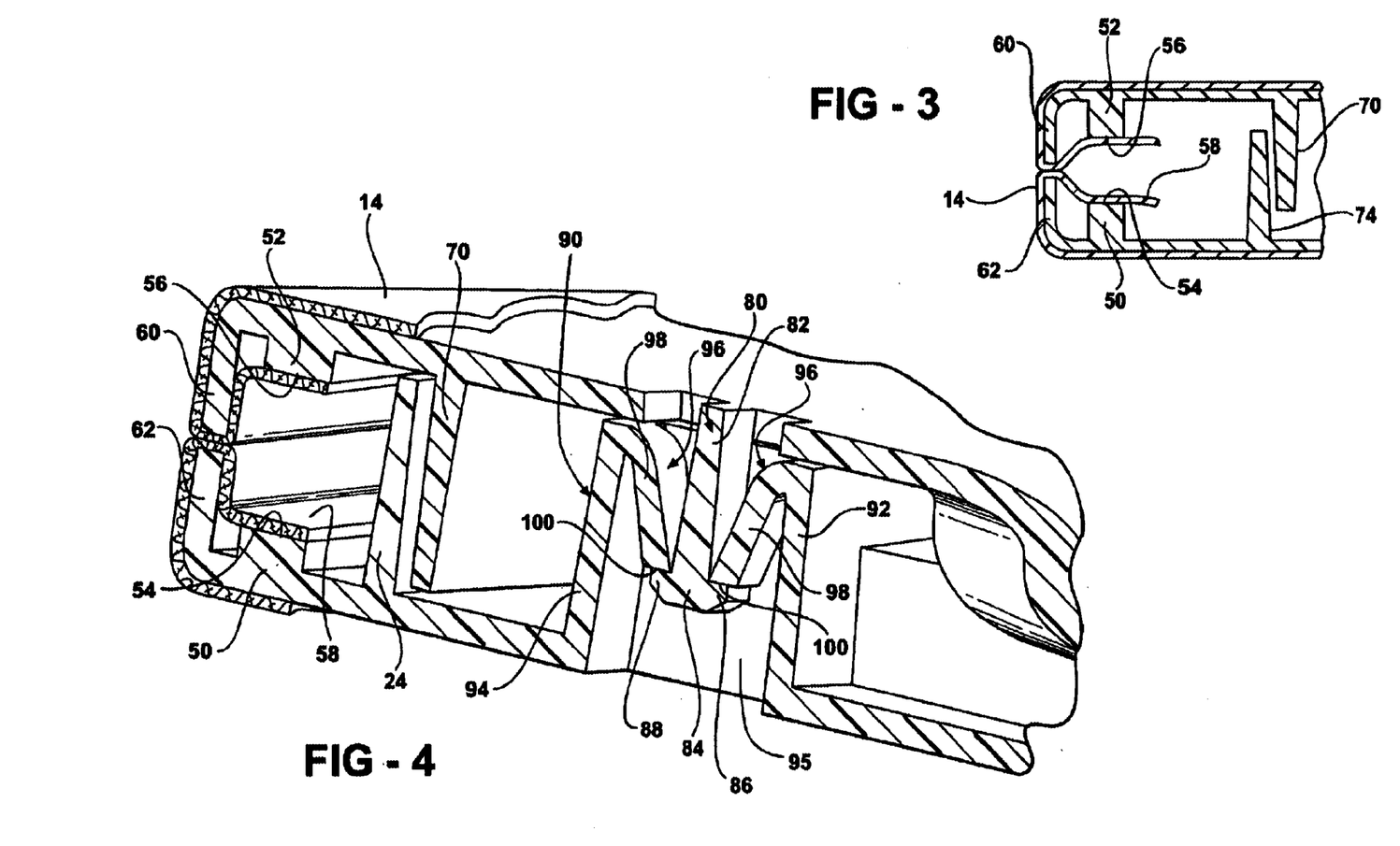
FIG. 3 is an enlarged, cross-sectional view of one corner of the clam shell core in the closed position showing the edge fold and edge material attached to the core.
FIG. 4 is an enlarged, perspective view of the corner of the core shown in FIG. 3.

Referring now to FIGS. 2–4, the core 12 is in the form of a clam shell having a first clam shell portion or half 20 and a second portion or half 22. The core 12 is formed of a suitable, light weight, easily formed material, such as plastic. A plastic useable to form the core 12 maybe polypropylene, by example only.

The first and second core halves 20 and 22 are integrally and pivotally joined together along a living hinge portion or edge 24 extending between one longitudinal edge of each of the core halves 20 and 22.

The core halves 20 and 22 have a substantially mirror image configuration formed of opposed longitudinal edges joined together to form the living hinge 24, outer longitudinal edges 26 and 28, adjacent side edges 30 and 32, and adjacent side edges 34 and 36. The side edges 26 and 28 may optionally be formed as part of a pivotal flap section pivotable about a living hinge or weakened portion 38 formed adjacent from each side edge 26 and 28.

Figure 1:
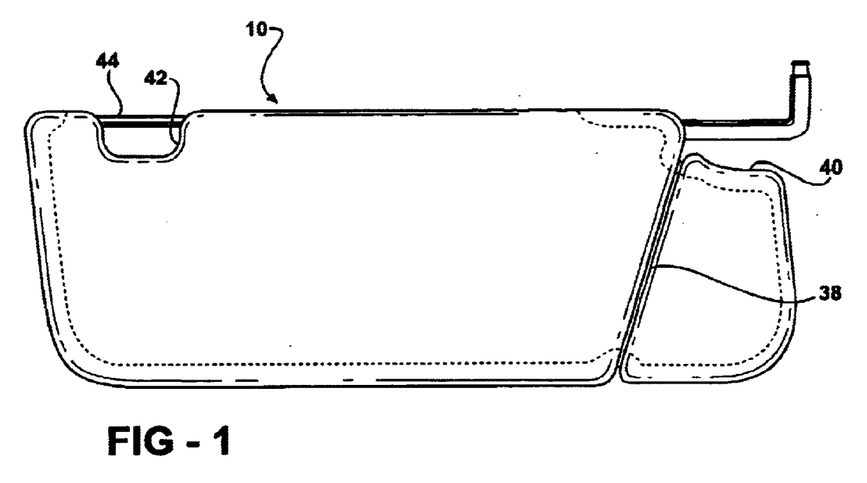
FIG. 1 is a perspective view of a completely assembled sun visor according to one aspect of the present invention.

As shown in FIGS. 1 and 2, an intermediate portion between the side edges 30 and 32 and an intermediate portion 40 between the side edges 30 and 32 of the first and second core halves 20 and 22, respectively, is recessed to form a space for insertion of one support arm 16 or 18 into the core 12. An end portion of the living hinge 24 between the core halves 20 and 22 is formed with an aperture 42 which, when the core 12 is in the closed, fully assembled position shown in FIG. 1, defines an open ended recess adapted for receiving a D-ring 44 for securing one end of the sun visor 10 to a latch member mounted in a vehicle head liner, not shown. The D-ring 44 is mounted in the core 12 by suitable clips, not shown.

The core 12 of the present invention is provided with a unique cover mounting means which insures a quick and secure mounting of the cover 14 on the outer surface of the core 12.

The cover mounting means includes an elongated, elevated cover attachment surfaces 50 and 52 respectively formed in the core halves 20 and 22. Each surface 50 and 52 is formed as one elongated projection extending between the side edges 30 and 34 and the side edges 32 and 36 or in a discontinuous fashion formed of multiple segments or projections. Each surface 50 and 52 terminates in a suitably formed outer mounting surface 54 and 56, respectively. Each surface 54 and 56 may be planar or have any other shape, such a smoothly curved concave or convex shape.

In the aspect of the surfaces 50 and 52 shown in FIGS. 2 and 3, each surface 50 and 52 has a generally C-shape, formed as a continuous member projecting outward from the main extent or plane of the core halves 20 and 22.

In attaching the cover 14 to the core 12, the core 12 and the cover 14 are juxtaposed as shown in FIG. 2 with cover 14 overlaying an outer surface of the core 12. In this arrangement, the outer peripheral edge of the cover 14 shown by reference number 58 projects outward beyond the periphery of the side edges 30, 32, 34 and 36 of the core 12. The outer peripheral edge 58 of the cover 14 is then folded over a peripheral lip 60 and 62 on each core half 20 and 22 and inward to a position in which the peripheral edge 58 of the cover 14 is in contact with and overlays each of the surfaces 54 and 56 on the surfaces 50 and 52. Sonic waves are then applied to the surfaces 50 and 52 to cause molecular vibration and melting of the surfaces 50 and 52 into the interstices of the cover thereby joining the cover 14 to the core halves 20 and 22, after cooling, in a secure connection or joint which extends substantially continuously about the entire periphery of the core 12.

As shown in FIGS. 2–4, alignment and stability enhancing members 70, 72, 74 and 76 are formed in complimentary positions in the core halves 20 and 22 so as to be disposed in close proximity with an opposed member, with contact also being possible, as shown in FIGS. 3 and 4, when the core halves 20 and 22 are folded into the closed, fully assembled position. The alignment members 70, 72, 74 and 76 may take any shape, with the generally angular, L-shape shown in FIG. 2 by way of example only.

Lock means are provided for securing locking the core halves 20 and 22 in a fully assembled, closed position shown in FIGS. 3 and 4. The lock means comprises a plurality of posts denoted generally by reference number 80 which are formed of a stem 82 and a head 84 having a radially outward extending periphery formed of at least two side arms 86 and 88. Rather than just two side arms 86 and 88, the entire periphery of the head 84 may be enlarged to a greater diameter or cross-section dimension than the diameter or cross-section of the stem 82 so as to provide an enlarged head which overhangs the outer periphery of the stem 82 as shown in FIG. 3. The posts 80 are deployed at a number of locations on one of the core halves 20 and 22, with the post 80 being shown by way of example only as being mounted on the core half 22.

A plurality of lock receivers 90 are formed in the other core half 20. The lock receivers 90 include an outer wall formed of at least two wall portions 92 and 94, with additional wall portions, including a third wall portion and even a fourth wall portion to form walls 92, 94, 95 and 97 as a completely closed, continuous wall may also be employed. Lock members are resiliently mounted on and extend from an end of at least two of the side walls 92 and 94. The lock members all denoted generally by reference number 96 include a leg 98 which terminates in an outer end 100. The legs 98 of the lock members 96 are disposed at an acute angle from the adjacent side wall 92 or 94 such that the outer end 100 is pivotal about the connection between the legs 98 and the adjacent side walls 92 and 94 of each receiver 90. This pivotal movement allows the head 84 of a complementarity positioned lock post 80 on the mating core half 22 to slide through the space normally existing between two adjacent lock legs 98 thereby urging the outer ends 100 outward until the head 84 snaps past the outer ends 100 of the legs 98. The legs 98 then snap back toward the nominal position and seat against a shoulder formed between the inner surface of the sides arms 86 and 88 of the head 84 and the adjacent outer surface of the stem 82 thereby securely locking the lock post 80 in the receiver 90. The same locking process occurs across the entire core 12 at every location of a matingly positioned receiver 90 and lock post 80.

Figure 5:
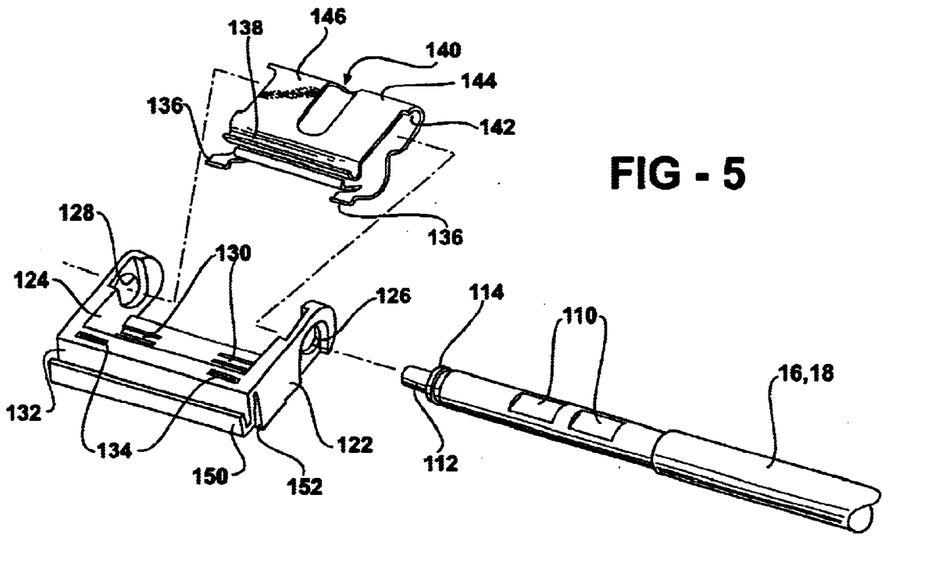
FIG. 5 is an exploded, perspective view of the slide carrier, clip and large support rod according to one aspect of the present invention.
Figure 6:
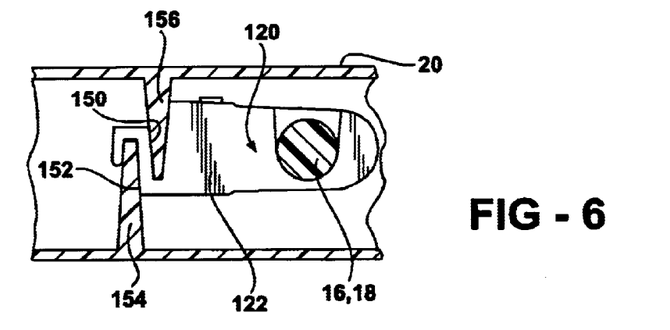
FIG. 6 is a cross sectional view showing the slider carrier, clip and support rod in a closed core position.

Referring again to FIGS. 1 and 2, and in greater detail in FIGS. 5 and 6, the support arm 16 is mounted within the core 12 prior to locking closure of the core halves 20 and 22 as described above. The support arm may take one of two configurations, including the telescoping, long length support arm 16 shown in FIGS. 7 and 8 and the shorter length support arm 18 shown in FIG. 9 for non-telescoping sun visors.

Regardless of the length of the support arm 16 or 18, the end portion of each support arm 16 or 18 includes at least one and preferably a pair of flats 110 adjacent an outer end 112, with only the support arm 16 being depicted in FIG. 5 by way of example only. The remainder of the support arm 16 may have a circular cross-section, by example only. A stop flange 114 is spaced from the outer end 112 of the support arm 18 to retain the support arm 18 in a slide carrier 120. The carrier 120 defines an integral, one piece body, typically of a molded plastic, having a pair of side arms 122 and 124, each with an aperture 126 and 128, respectively, the apertures 126 and 128 being coaxially aligned for receiving the end portion of the support arm 18 with the flats 110 disposed between the side arms 122 and 124.

A first pair of apertures 130 are formed in a central leg 132 of the slider 120. A second pair of apertures 134 are also formed in the central leg 132 of the slider 120. The pairs of apertures 130 and 134 receive bent edges 136 and 138 of a spring clip 140 to attach the spring clip 140 to the slider 120. The spring clip 140 has an enlarged end portion denoted by reference number 142 which receives the end portion of the support arm 16. A pair of bent portions 144 and 146 on the spring clip 140 resiliently engage the flats 110 on the end of the support arm 18 to exert a biasing force tending to retain the entire sun visor 10 in a fixed position, typically biased in a direction toward the vehicle headliner in a normal, stored sun visor position to minimize buzz, squeaks or rattles. This provides the necessary noise control features for the sun visor 10 of the present invention.

The sun visor 10 has a unique telescoping mount using the slide carrier 120 which may be used by itself or in combination with the heat stake cover attachment described above as well as with or without any of the additional unit features of the sun visor described hereafter.

The slide carrier 120 includes first and second, oppositely directed, open ended channels 150 and 152 which are integrally formed in the carrier 120. The open end of the channel 150 extends oppositely from the open end of the channel 152. The channels 150 and 152 are positioned to engage slide rails 154 and 156, shown in FIGS. 2, 6, 7 and 8 which are integrally formed as part of the core halves 20 and 22, respectively. The slide rails 154 and 156 extend along the length of each core half 20 and 22, generally in parallel with the hinge 24.

When the core halves 20 and 22 are locked in the fully assembled, closed position shown in FIG. 6, the slide rail 154 engages the channel 150 and the opposed slide rail 156 engages the opposite channel 152 in the slider 120. This dual, opposed slide rail and channel configuration securely retains the slider 120 in a constant orientation during all telescoping movement of the sun visor 10 relative to the support arm 16 as described hereafter. The addition of the second channel 150 and the slide rail 154 provides added stability to insure a smooth, even bi-directional telescoping movement of the sun visor 10 along the support arm 16 while at the same time securely retaining the sun visor 10 to the support arm 16.

FIG. 7 depicts the normal, non-telescope position of the sun visor 10 relative to the support arm 16. In this position, the carrier 120 is disposed adjacent to the D-ring end of the sun visor 10. When the vehicle occupant desires to laterally extend the position of the sun visor 10 relative to the support arm 16, the occupant grasps the sun visor 10 and slides the sun visor 10 along the support arm 16 to any position up to a maximum extend position shown in FIG. 8. In the maximum extended position, the carrier 120 is disposed adjacent to a support arm pivot support or clip 160. The clip 160, shown in FIGS. 7, 8 and 9, includes a wall integrally formed on one of the core halves, such as the second core half 22 having an aperture 162 for receiving the support arm 16 therethrough. The portion 164 of the wall 160 carrying the aperture 162 is spaced from a collar 166, also formed on the core half 22, which defines a generally circular cross-section bore through which the support arm 16 extends.

The sun visor 10 may also be provided with the short length support arm 18 for non-telescoping use without any modifications to the core 12. By example only, the non-telescoping aspect of the present sun visor 10 also employs the carrier 120, the support wall 160 and the sleeve 166. However, the carrier 120 is non-laterally moveably disposed within the wall 160 as shown in FIG. 9.

Referring now to FIGS. 10–14, there is depicted several aspects of a mirror assembly which may be optionally employed with the sun visor 10 of the present invention. It will be understood that the various aspects of the mirror assembly described hereafter are useable independently or in combination with any of the telescoping, fabric cover mount or core lock means described above.

Figure 10:
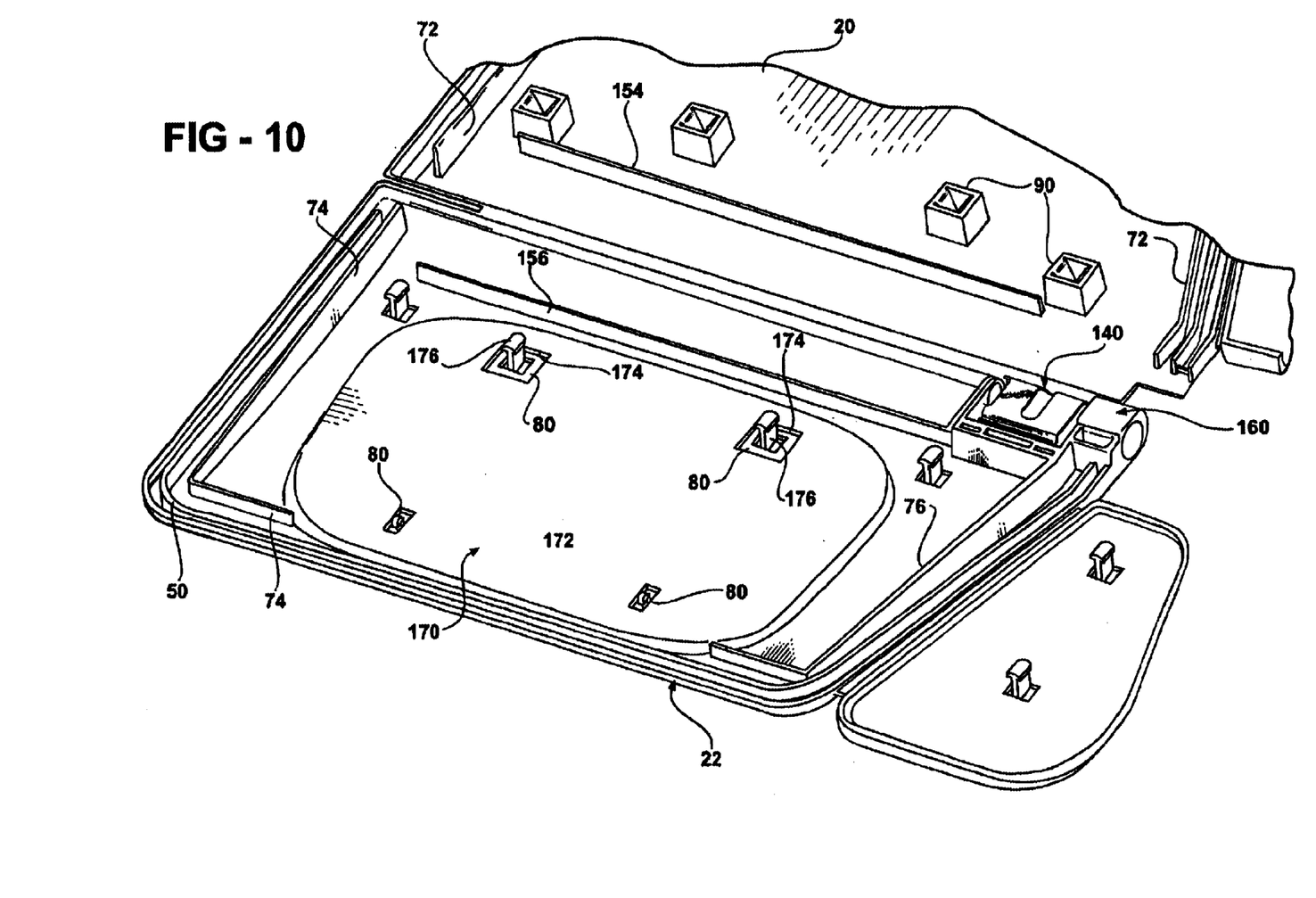
FIG. 10 is a perspective view of another aspect of the sun visor according to the present invention shown in an open core position and depicting the mounting of a mirror to one core half.

In one aspect of a mirror assembly shown in FIG. 10, which preferably applies to all the mirror assemblies described hereafter, a shallow recess 170 is formed in the core half 22 projecting slightly out of the plane of the main extent of the core half 22. The recess 170 is formed by a wall 172.

At least one and preferably a plurality of spaced apertures 174 are formed in the wall 172. Each aperture 174 is alignable with a corresponding lock receiver 90 on the mating core half 20. Each aperture 174 is positioned to receive a lock post 80, identical to the lock post 80 described above for locking the core halves 20 and 22 in the fully closed, assembled position, but now provided on a back plate 176 of a frame or mirror support. The lock posts 80 project from the back wall or plate 176 so as to extend through the apertures 174 and the wall 172 and into locking engagement with the mating receiver 90 when the core halves 20 and 22 are pivoted to the fully closed position. This enables the mirror assembly to be fixedly attached to the core 10 at the same time the core halves 20 and 22 are locked in the closed, fully assembled position.

Figure 11:
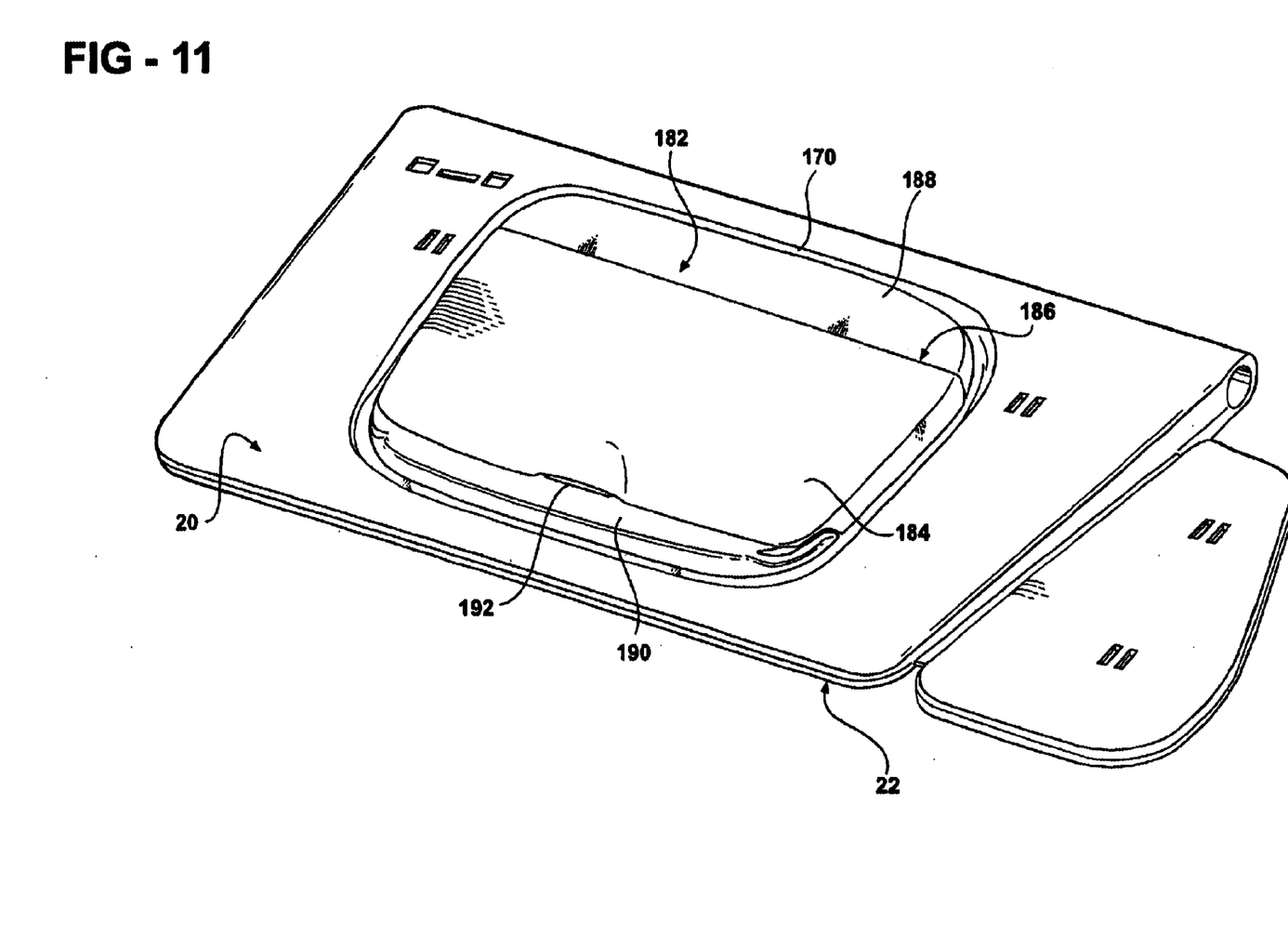
FIG. 11 is a perspective view of a completed sun visor showing one aspect of a fully optioned mirror assembly with a cover deployed in a closed position.
Figure 12:
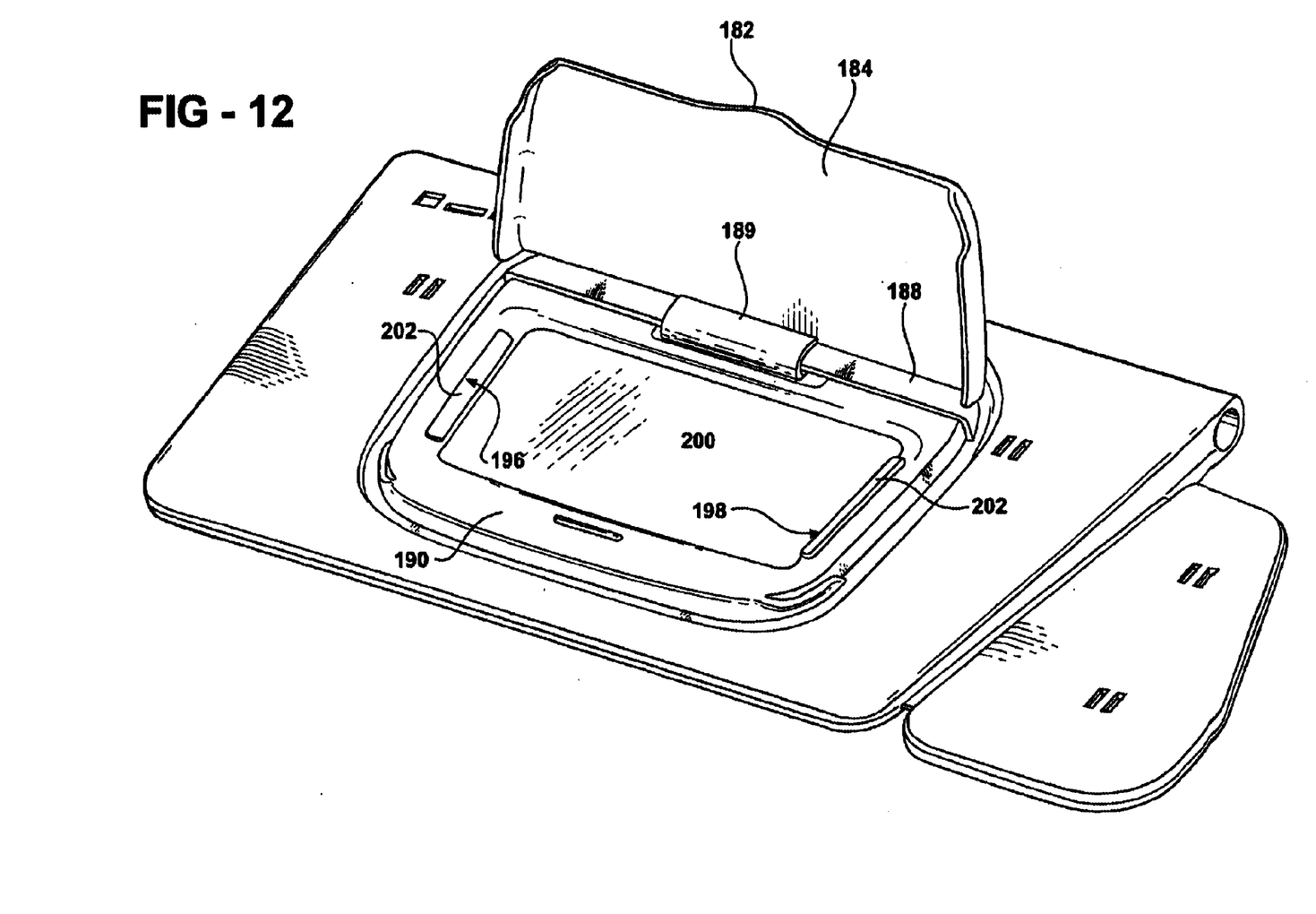
FIG. 12 is a perspective view, similar to FIG. 11, but with the cover deployed in an open position.

FIGS. 11 and 12 depict an opposite surface of the core half 22 which has the recess 170 formed therein for receiving a mirror assembly 182. In this aspect of the mirror assembly 182, the mirror assembly 182 includes a moveable or pivotal cover 184 which is pivotally mounted to a frame 186 formed of a fixed frame member 188 attached to the back plate 176 shown in FIG. 10 and a mirror surround frame 190, only a portion of which is shown in FIG. 11. The cover 184 has a generally planar extent, with depending side walls and a raised edge 192 to permit easy pivotal movement of the cover 184 between open and closed positions shown in FIGS. 12 and 11, respectively. A hinge 189 is provided between a fixed frame element 188 and the cover 184.

The mirror assembly 182, as shown in FIG. 12, also is provided with an illumination means in the form of one or more lamp means 196 and 198 mounted in the mirror surround frame 190 on at least one and preferably opposed sides of a reflective mirror 200. The mirror 200 is typically adhesively joined to the back plate 176. Conductors for conducting power to the light means 196 and 198 located below the bezzles or lenses 202 are routed between the closed core halves 20 and 22 and into an aperture formed in the support arm 16 or 18 whereby the wires exit the sun visor 10 and pass through the vehicle interior, typically through the vehicle A pillar to the accessory power vehicle circuit.

Figure 13:
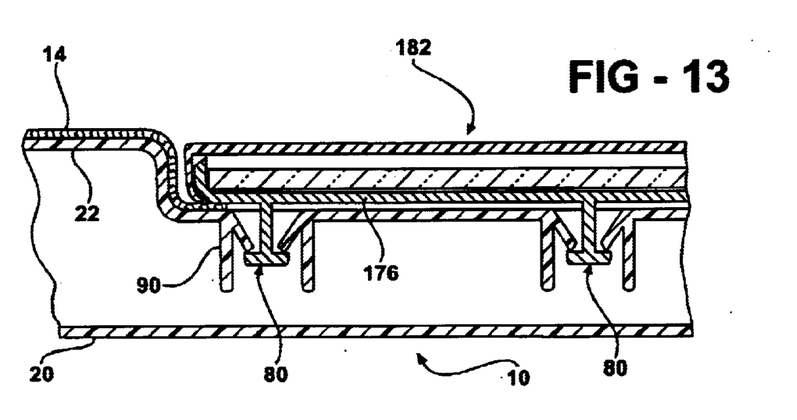
FIG. 13 is a cross-sectional view through the sun visor of FIG. 11 depicting the mounting of the mirror assembly to the core and cover.

According to a unique aspect of the present invention, the mirror assembly 182 is mounted on the sun visor 10 after the core halves 20 and 22 of the sun visor 10 have been pivoted to the closed, latched position. As shown in FIG. 13, the lock post 80 may be forced through the fabric cover 14 into the underlying receiver 90 to fixedly mount the mirror assembly 182 to the sun visor 10. The layer of the cover fabric 14 disposed between the back wall 176 of the mirror assembly 182 and the core half 20 minimizes the generation of buzzes, squeaks and rattles.

Figures 14, 15:
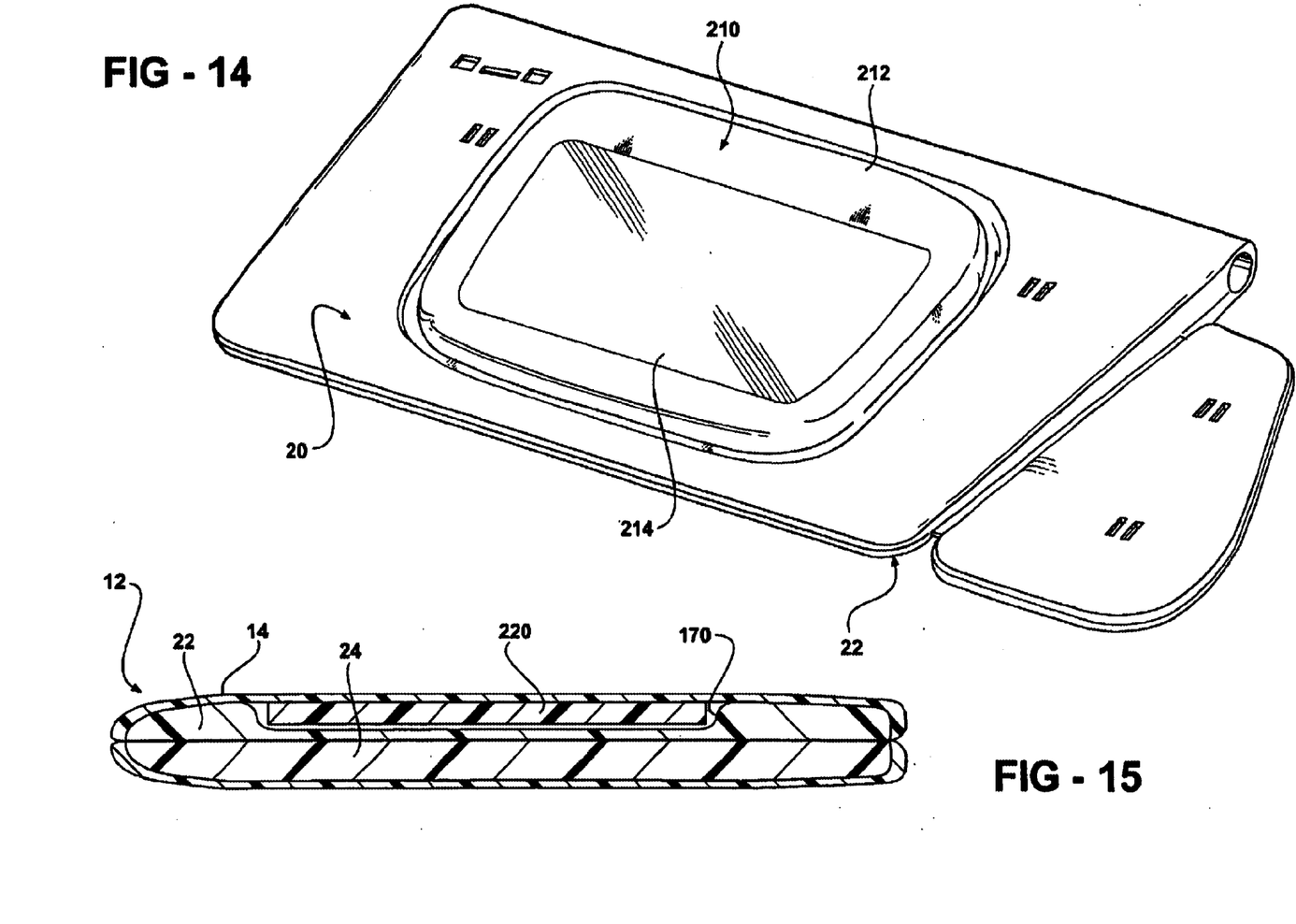
FIG. 14 is a perspective view of another aspect of a sun visor according to the present invention having a mirror assembly mounted therein.
FIG. 15 is a cross-sectional view of an alternate aspect of the sun visor of the present invention.

It will be understood that the mirror assembly 182 may be provided without the lamp means 196 and 198 and with or without the pivotal cover 184. Another mirror assembly 210 is depicted in FIG. 14. In this aspect, the mirror apparatus is formed of a multi-sided frame 212 which surrounds a mirror 214 secured, typically by adhesive, to a back plate, not shown. The back plate can be identical to the back plate 176 so as to carry the lock posts 80 for secure attachment of the mirror assembly 210 to the core half 22 as described above.

As shown in FIG. 15, the core 10 having the recess 172 formed in one of the core halves for receiving one of the mirror assemblies described above, may also be utilized without any mirror assemble. In this application, a filler member 220 has a peripheral shape complementary to the shape of the recess 170 in the core half 22 and a thickness substantially the same as the depth of the recess 170.

In use, the filler member 220 is mounted within the recess 170 and covered by the cover 14 which holds the filler member 220 in the recess 170. Alternately, the filler member 220 may be fixed in the recess 170 by means of adhesive, etc.

The use of the filler member 220 provides a flush surface with the surrounding surface of the core half 22 when a mirror assembly is not used in the sun visor 10. At the same time, the filler member enables a single core 12 design to be employed with and without a mirror assembly without requiring any modification or additional manufacturing cost.

In summary, there has been disclosed a unique vehicle sun visor having improved fabric cover attachment, easy and reliable telescoping visor movement, the option to switch between a telescoping support arm and a fixed short support arm without modification to the sun visor core so as to contribute to a reduced manufacturing cost, multiple mirror assembly mounts, unique and reliable core lock members, and a mirror attachment means which controls or minimizes the generation of noise between the contacting parts of the mirror and the sun visor core.

What is claimed is:

1. A sun visor comprising:

a core having first and second foldable core halves;

guide means carried on one of the first and second core halves;

a carrier having at least one through aperture;

a support arm extending through the aperture in the carrier; and rib means, carried on each of the first and second core halves and engagable with the carrier, for controlling sliding movement of the carrier with respect to the first and second core halves as the core is moved relative to the support arm.

2. The sun visor of claim 1 wherein the rib means comprises:

first and second ribs respectively carried on the first and second core halves.

3. The sun visor of claim 2 wherein the carrier comprises:

a body having first and second channels opening oppositely from each other, each of the first and second channels receiving the first and second ribs, respectively.

4. The sun visor of claim 1 further comprising;

clip means mountable in the carrier and engaging the support arm for normally biasing the core in one direction.

5. The sun visor of claim 4 wherein:

the clip means is disposed in biasing engagement with the support arm.

6. A sun visor comprising:

a core having first and second foldable core halves;

guide means carried on at least one of one of the first and second core halves;

a carrier having at least one through aperture, the carrier movably mounted in the guide means;

a support arm extending through the aperture into the carrier;

clip means, removably affixed to the carrier and engaged with the support arm, for biasing the core in a fixed direction;

first and second ribs carried on the first and second core halves; and first and second open ended channels formed in the carrier and opening oppositely from each other, each of the first and second channels receiving the first and second ribs, respectively.

7. The sun visor of claim 1 wherein the rib means comprises:

first and second ribs carried on the first and second core halves; and first and second open ended channels formed in the carrier and opening oppositely from each other, each of the first and second channels receiving the first and second ribs, respectively.

* * * * *